United States Patent
Wang

(10) Patent No.: US 7,204,760 B2
(45) Date of Patent: Apr. 17, 2007

(54) CONSTANT VELOCITY JOINT VENT

(75) Inventor: Shen-Ling Allen Wang, Northville, MI (US)

(73) Assignee: GKN Driveline North America, Inc., Auburn Hills, MI (US)

(*) Notice: Subject to any disclaimer, the term of this patent is extended or adjusted under 35 U.S.C. 154(b) by 0 days.

(21) Appl. No.: 10/830,254

(22) Filed: Apr. 21, 2004

(65) Prior Publication Data

US 2005/0239554 A1    Oct. 27, 2005

(51) Int. Cl.
*F16D 3/223*    (2006.01)

(52) U.S. Cl. ......................... 464/17; 464/906

(58) Field of Classification Search .................. 464/11, 464/15, 17, 905, 906; 137/854
See application file for complete search history.

(56) References Cited

U.S. PATENT DOCUMENTS

| | | | | |
|---|---|---|---|---|
| 2,173,571 A | * | 9/1939 | Jesnig | 137/854 |
| 2,769,457 A | * | 11/1956 | Wittenberg | 137/854 X |
| 3,454,182 A | * | 7/1969 | Morton | 137/854 X |
| 3,568,711 A | * | 3/1971 | Katz | 137/854 X |
| 3,620,023 A | * | 11/1971 | Schmid | 137/854 |
| 4,319,467 A | | 3/1982 | Hegler et al. | |
| 4,508,522 A | * | 4/1985 | Numazawa et al. | 464/11 |
| 4,658,979 A | * | 4/1987 | Mietz et al. | |
| 6,010,409 A | | 1/2000 | Johnson | |
| 6,220,967 B1 | | 4/2001 | Miller | |
| 6,530,843 B2 | * | 3/2003 | Miller et al. | 464/15 X |
| 6,540,616 B2 | * | 4/2003 | Miller et al. | 464/17 |
| 6,988,949 B2 | * | 1/2006 | Wang | 464/17 |
| 2002/0132669 A1 | * | 9/2002 | Chrobak et al. | 464/17 |
| 2005/0101390 A1 | * | 5/2005 | Wang | 464/17 |

* cited by examiner

*Primary Examiner*—Greg Binda
(74) *Attorney, Agent, or Firm*—Jennifer M. Brumbaugh; Mick A. Nylander

(57) ABSTRACT

A vent valve for use in a constant velocity joint having a vent aperture in communication with a joint cavity comprises a body portion having a first end and a second end and a plurality of escape pathways extending therebetween. An umbrella shaped flexible retention cap is disposed adjacent the first end of the body portion and the plurality of escape pathways, wherein the retention cap is operative in a normally closed position to cover the plurality of escape pathways and seal the joint from external contaminants, and in response to internal pressure created in the joint cavity functions to bellow outward and expose the plurality of escape pathways to permit air to escape from the cavity.

20 Claims, 10 Drawing Sheets

CONSTANT VELOCITY JOINT VENT

TECHNICAL FIELD

The present invention relates to an improved venting constant velocity universal joint, and more specifically to a constant velocity joint vent.

BACKGROUND ART

Most constant velocity universal joints are sealed in order to retain grease inside the joint while keeping contaminants and foreign matter, such as dirt, water, and the like out of the joint. In order to achieve this protection, the constant velocity joint is usually enclosed at the open end of the outer race by a sealing boot made of rubber, thermoplastic or urethane. The opposite end of the outer race is sometimes formed by an enclosed dome known in the art as a "grease cap". Such sealing and protection of the constant velocity joint is necessary because, once the inner chamber of the outer joint is partially-filled and thus lubricated, it is generally lubricated for life.

It is often necessary to vent the constant velocity joint in order to minimize air pressure fluctuations due to expansion and contraction of the air within the joint during operation of the joint. This is especially true, for example, in the case of tripod-type, plunging VL and mono block constant velocity joints.

As those skilled in the art will recognize, a tripod joint is characterized by a bell-shaped outer race (housing) disposed around an inner spider joint which travels in channels formed in the outer race. The spider-shaped cross section of the inner joint is descriptive of the three equispaced arms extending therefrom which travel in the tracks of the outer joint. Part spherical rollers are featured on each arm.

Plunging tripod joints are currently the most widely used inboard (transmission side) joint in front wheel drive vehicles, and particularly in the propeller shafts found in rear wheel drive, all-wheel drive and 4-wheel drive vehicles. A common feature of tripod universal joints is their plunging or end motion character. Plunging tripod universal joints allow the interconnection shafts to change length during operation without the use of splines which provoke significant reaction forces thereby resulting in a source of vibration and noise.

The plunging tripod joint accommodates end wise movement within the joint itself with a minimum of frictional resistance, since the part-spherical rollers are themselves supported on the arms by needle roller bearings. In a standard ball roller type constant velocity joint the intermediate member of the joint (like the ball cage in a Rzeppa constant velocity joint) is constrained to always lie in a plane which bisects the angle between the driving and driven shafts. Since the tripod type joint does not have such an intermediate member, the medium plane always lies perpendicular to the axis of the drive shaft.

A Plunging VL or "cross groove" type constant velocity joint consists of an outer and inner race drivably connected through balls located in circumferentially spaced straight or helical grooves alternately inclined relative to a rotational axis. The balls are positioned in a constant velocity plane by an intersecting groove relationship and maintained in this plane by a cage located between the two races. The joint permits axial movement since the cage is not positionably engaged to either race.

High speed fixed joints are used where transmission of high speed is required. High speed fixed joints allow articulation to an angle (no plunge) but can accommodate much higher angles than with a Cardan joint or other non-CV joints such as, for example, rubber couplings. There are generally three types of high speed fixed joints: (1) disk style that bolts to flanges; (2) monoblock style that is affixed to the tube as a center joint in multi-piece propshafts; and (3) plug-on monoblock that interfaces directly to the axle or T-case replacing the flange and bolts.

A high speed fixed joint generally comprises: (1) an outer joint member of generally hollow configuration, having a rotational axis and in its interior, a plurality of arcuate tracks circumferentially spaced about the axis extending in meridian planes relative to the axis, and forming lands between the tracks and integral with the outer joint part wherein the lands have radially inwardly directed surfaces; (2) an inner joint member disposed within the outer joint member and having a rotational axis, the inner joint member having on its exterior a plurality of tracks whose centerline lie in meridian planes with respect to the rotational axis of the inner joint member in which face the tracks of the outer joint member and opposed pairs, wherein lands are defined between the tracks on the inner joint member and have radially outwardly directed surfaces; (3) a plurality of balls disposed one in each pair of facing tracks in the outer and inner joint members for torque transmission between the members; and (4) a cage of annular configuration disposed between the joint members and having openings in which respective balls are received and contained so that their centers lie in a common plane, wherein the cage has external and internal surfaces each of which cooperate with the land surfaces of the outer joint member and inner joint member, respectively to locate the cage and the inner joint member axially.

Typically, constant velocity joints are vented by placing a small hole generally in the center of the grease cap or, in the case of mono block high speed fixed joints, by placing a hole in the vent plate. This allows for the passage of air in and out of the joint as needed, in order to prevent pressure buildup which occurs during operation of the joint. However, when the constant velocity joint is in a static state and not rotating, grease may settle in the vent hole, blocking it and hindering its function. This condition may create a pressure buildup and possibly result in joint failure due to a ruptured boot, among other things. During this static state, grease may also flow from the vent hole and out of the joint, thereby resulting in the loss of grease from the joint. This loss of lubricant could possibly lead to more frequent relubrication and maintenance, and eventually possible replacement of the joint. Still further, in off road, submerged, or other severe weather vehicle conditions, water and other contaminants may enter the joint through the vent hole and impair joint operation.

U.S. Pat. No. 4,319,467 issued to Hegler et al. discloses a sealed vent subassembly press fitted into the collar bore of a universal joint. The subassembly includes a vent disc which is nested in a seal disc to form a venting arrangement to the exterior of the housing by way of various holes and chambers. However, this vent hole may still be subject to grease buildup during a static state or operative state.

U.S. Pat. No. 6,010,409 issued to Johnson and assigned to GKN Automotive, Inc., the assignee of the present invention, discloses a vent regulator device for use in a constant velocity joint including a housing having an inner surface defining an inner cavity. The inner surface includes an annular portion, a domed portion which has a relatively small vent hole centrally located therein. The vent regulator device further includes a member having a first end and a second end where the first end is mounted to the inner surface of the housing and the second end is disposed proximate the vent hole. When the constant velocity joint is in one of either a static state or an active state rotating at speeds below a predetermined threshold, the vent hole is overlappingly covered by the first end of the member, thereby preventing grease from penetrating the hole. Moreover, when the constant velocity joint is in an active state rotating at speeds above the predetermined threshold, centrifugal forces cause the second end of the member to move away radially from the vent hole to allow venting of air therethrough.

U.S. Pat. No. 6,220,967 issued to Miller and assigned to GKN Automotive, Inc., the assignee of the present invention, discloses a constant velocity joint plug for use with a universal joint having a vent aperture. The joint plug comprises a substantially rigid elongate body having a first end and a second end with a vent cavity extending therebetween. A retention cap having an escape aperture is disposed adjacent the first end. The vent plug is fitted in the vent aperture and extends into the joint cavity above the grease fill line. In operation, pressure created in the joint cavity by grease volatility and high internal running temperatures ("overpressure") is relieved through the vent cavity of the vent plug and released out of the joint by the escape aperture. Stabilization is continuous as the escape aperture releases air in direct relation to any increase in internal pressure of the joint.

SUMMARY OF THE INVENTION

It is a principal object of the present invention to provide a system for venting a constant velocity joint without loss of grease or other internal joint lubricant.

It is a further object of the present invention to provide an improved constant velocity joint.

It is a further object of the present invention to provide such a system for venting a constant velocity joint which prevents water, dirt and other contaminants which may inhibit joint operation from entering the joint.

It is a further object of the present invention to provide a vent having multiple pathways for a constant velocity joint.

In carrying out the above objects, there is provided a venting constant velocity joint system comprising a constant velocity joint having a vent aperture in communication with an internal joint cavity. The aperture may be provided directly in the joint (e.g. in a grease cap), or any suitable component thereof, such as, for example, a vent plate commonly used in mono-block designs. The system further includes a vent valve receivable in the vent aperture. The vent valve comprises a body portion having a first end and a second end and at least one escape pathway extending therebetween and a flexible retention cap disposed adjacent the first end of the body portion and the at least one escape pathway. In operation, the retention cap covers the at least one escape pathway and seals the joint from external contaminants in a normally closed position. In response to internal pressure created in the joint cavity, the retention cap opens and exposes the at least one pathway to permit air to escape from the cavity.

The above objects and other objects, features, and advantages of the present invention will become more readily apparent from the following detailed description of the best modes for carrying out the invention when taken in conjunction with the accompanying drawings.

BEST MODE FOR CARRYING OUT THE INVENTION

Figure 1:
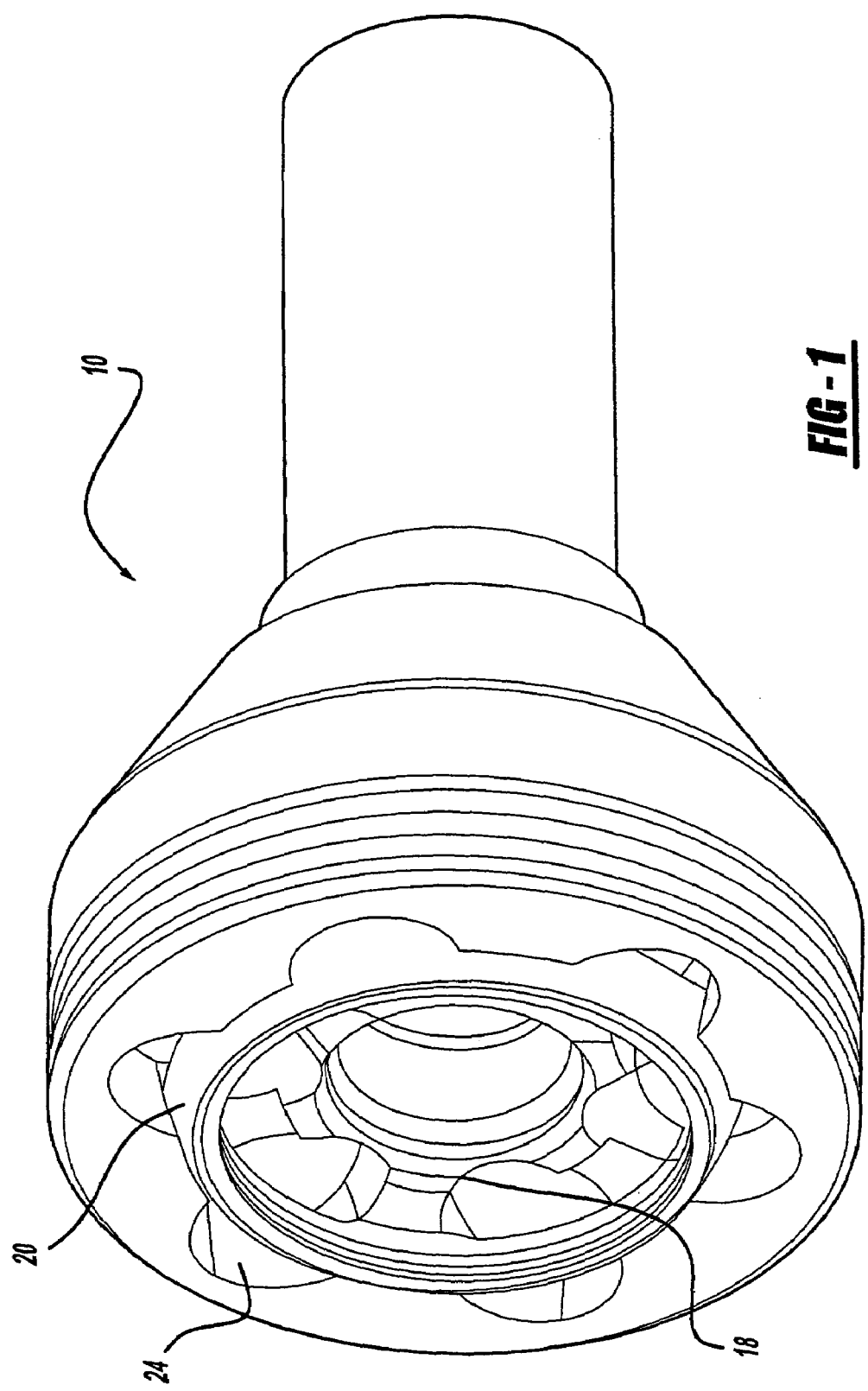
FIG. 1 is a perspective view of a first embodiment of the venting constant velocity joint system according to the present invention as shown in a mono block design.
Figure 2:
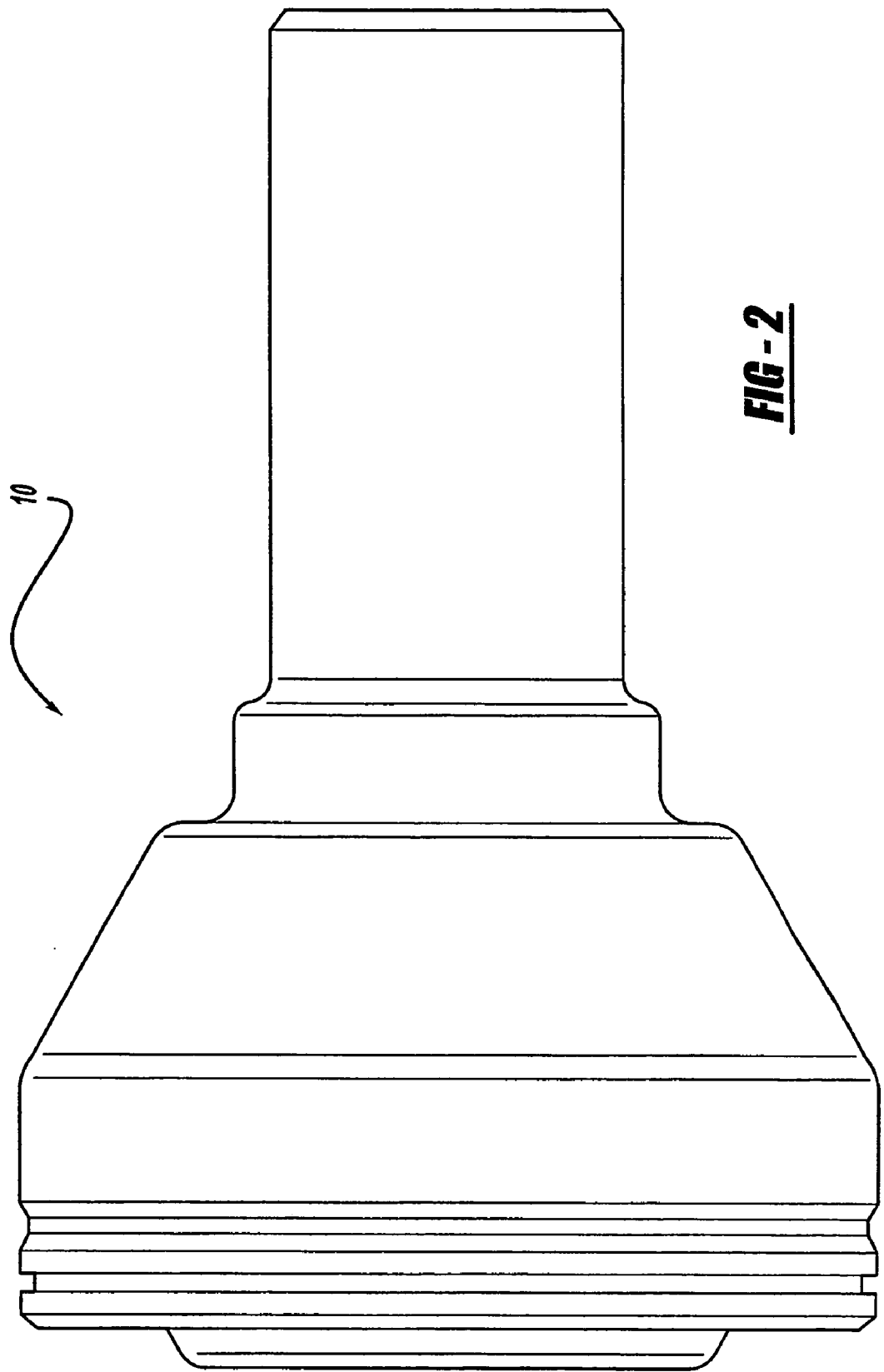
FIG. 2 is a side view of the venting constant velocity joint system of FIG. 1.
Figure 3:
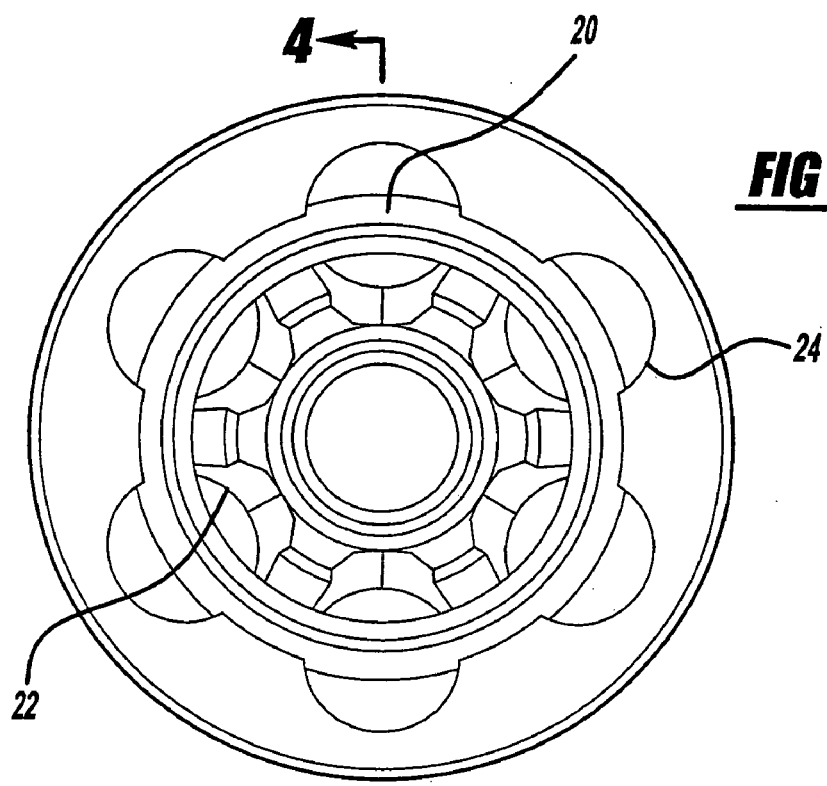
FIG. 3 is a front view of the venting constant velocity joint system of FIGS. 1–2.
Figure 5:
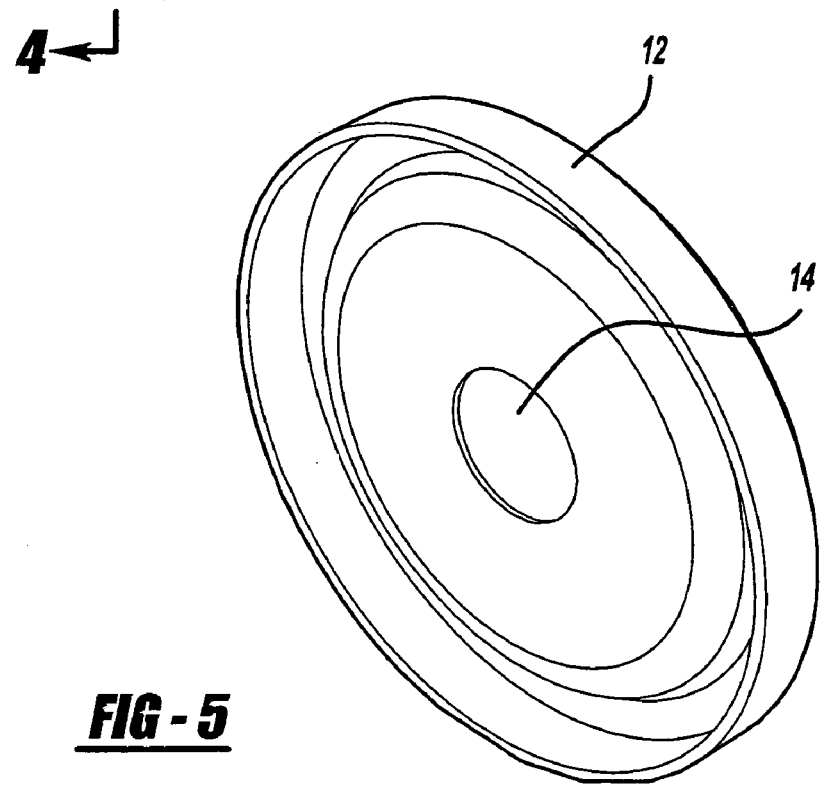
FIG. 5 is a perspective view of the venting plate of FIG. 4.
Figure 4:
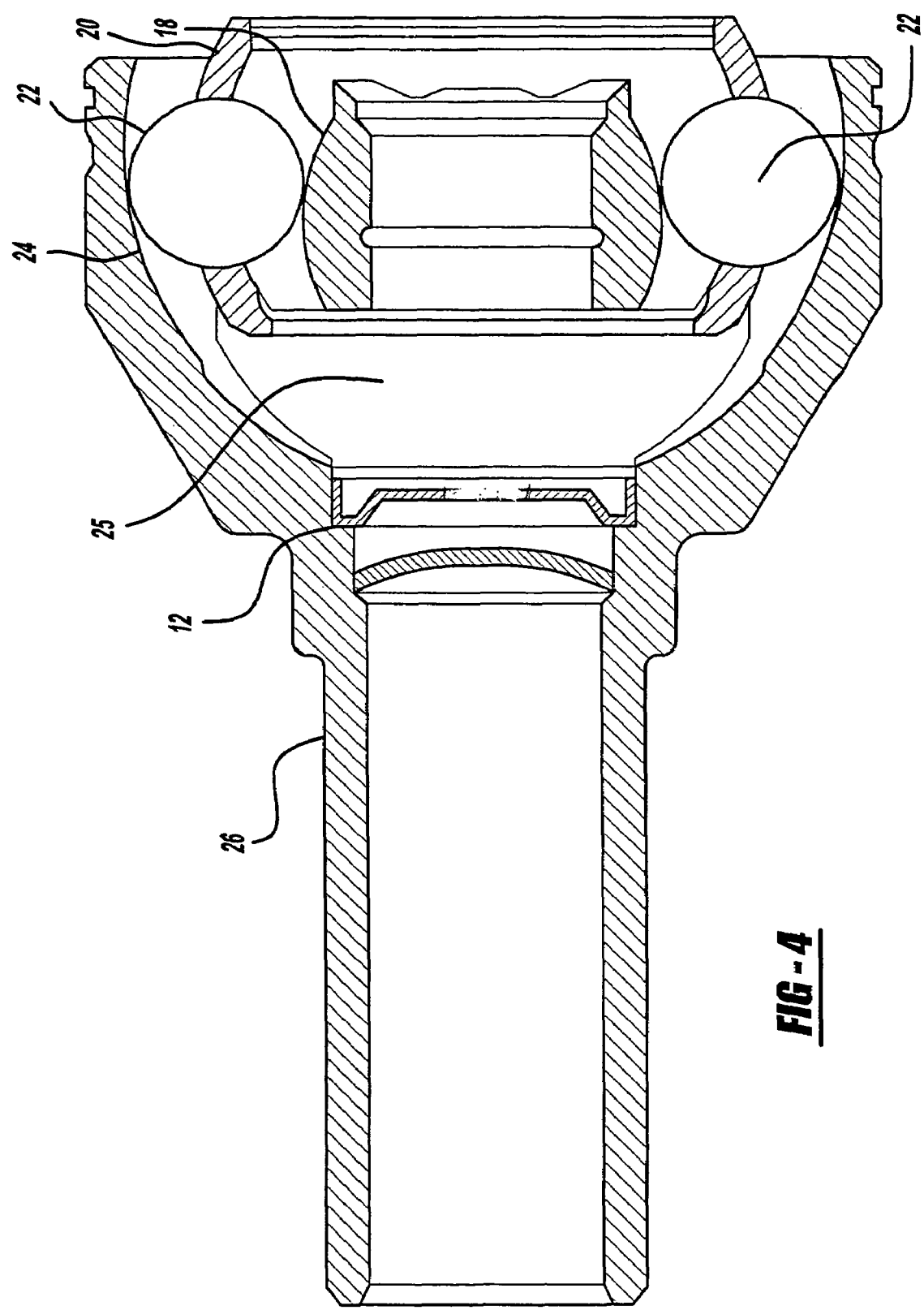
FIG. 4 is a partial cross-sectional view of the venting constant velocity joint system of FIGS. 1–3 taken along line 4—4 of FIG. 3.
Figure 6:
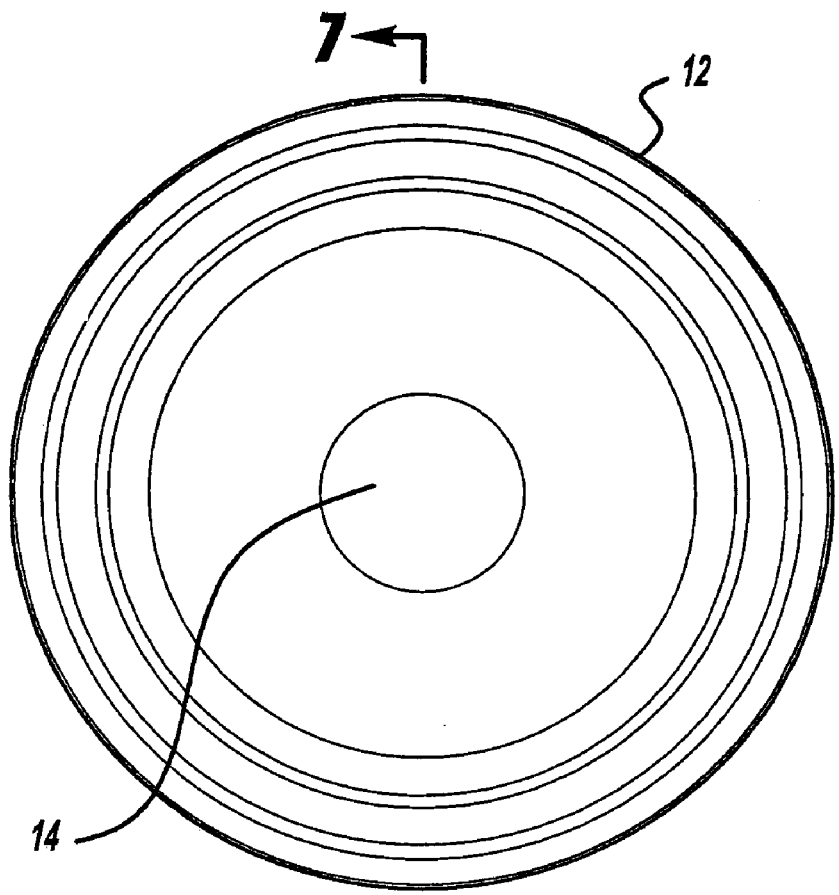
FIG. 6 is a plan view of the venting plate of FIGS. 4–5.
Figure 7:
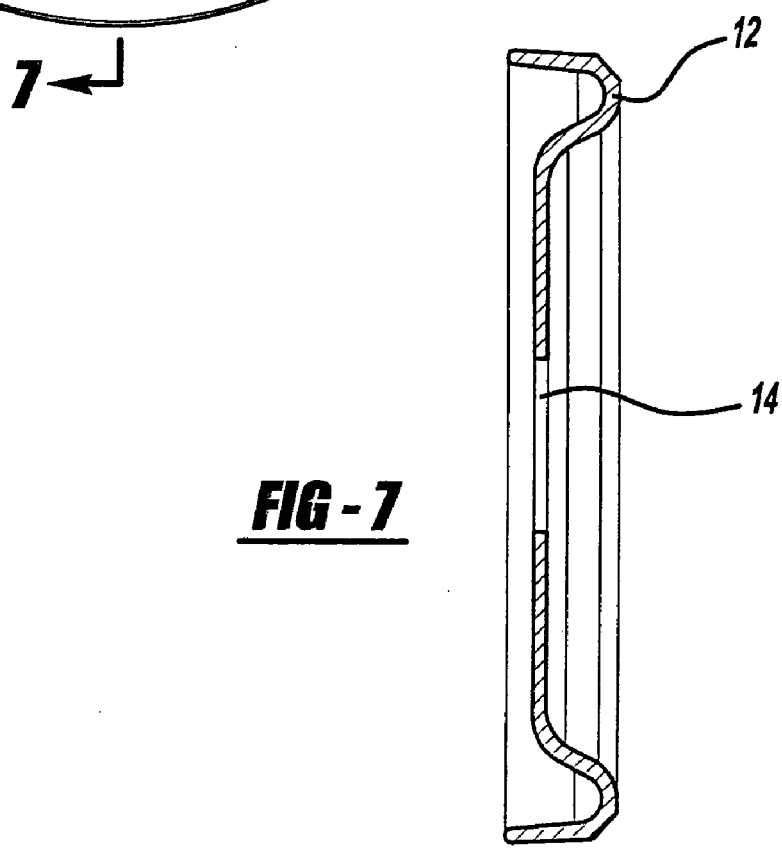
FIG. 7 is a cross-sectional view of the venting plate of FIGS. 4–6 taken along line 7—7 of FIG. 6.
Figure 8:
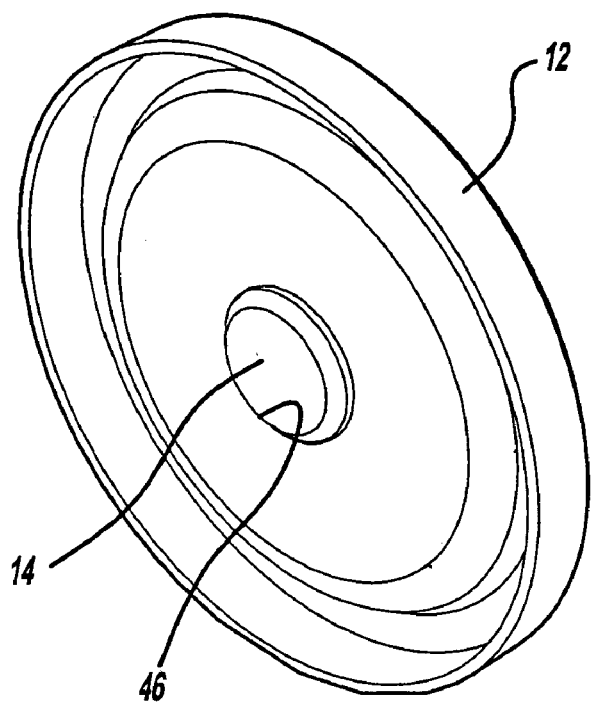
FIG. 8 is a perspective view of the venting plate and vent valve of FIG. 4.
Figure 9:
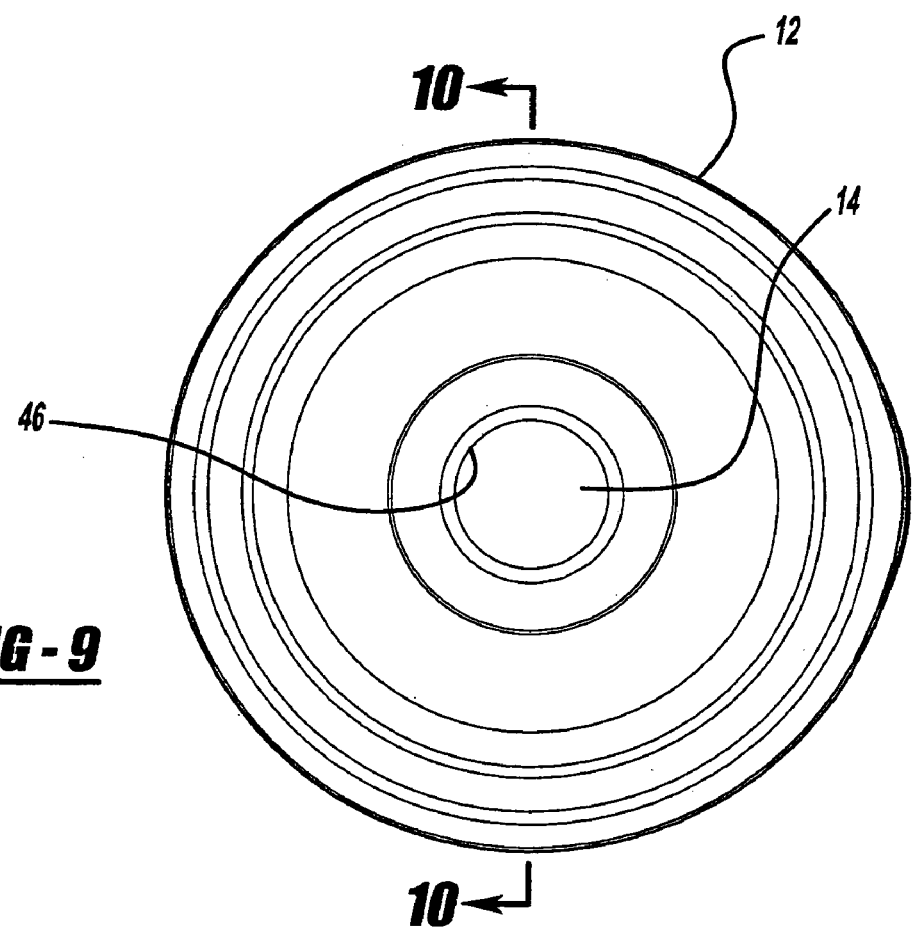
FIG. 9 is a plan view of the venting plate and vent valve of FIG. 8.

Referring now to FIGS. 1–4, there is shown generally a monoblock type of universal joint and more specifically a constant velocity universal joint 10 of the fixed or Rzeppa type. Constant velocity joint 10 comprises an inner race 18, a cage 20, balls 22 and outer race 24 disposed within the joint chamber 25. As those skilled in the art will recognize, usually six balls 22 are used with the constant velocity joint 10. It should be noted that any of the other known types of constant velocity joints may also be used with the present invention.

As shown in greater detail in FIGS. 5–13, a vent plate 12 (also called a breather plate) is disposed within constant velocity joint 10 and defines a vent aperture 14 adapted to receive a vent valve 16. Vent plate 12 may be any suitable size or shape depending on the application. However, in the preferred embodiment shown, venting plate 12 comprises an annular member adapted to be disposed in the closed end 26 of constant velocity joint 10.

Vent valve 16 comprises a body portion 28 having a first end 30 and a second end 32 and at least one and preferably a plurality of escape pathways 34 axially extending therebetween. Vent valve 16 further includes a flexible retention cap 36 disposed adjacent the first end 30 of the body portion 28 and the at least one escape pathway 34. Retention cap 36 is preferably, but not necessarily, umbrella shaped having a surface area which extends and covers the area of vent aperture 14 when the vent valve 16 is disposed therein. Retention cap 36 may extend from any portion of the body 28 or vent valve 16. As can be seen in FIG. 11, in one embodiment it is preferred that retention cap 36 is defined by an uninterrupted and continuous periphery. Further, as is also evident from FIGS. 10 and 11, the periphery of retention cap 36 is larger than a periphery of body portion 28.

Figure 10:
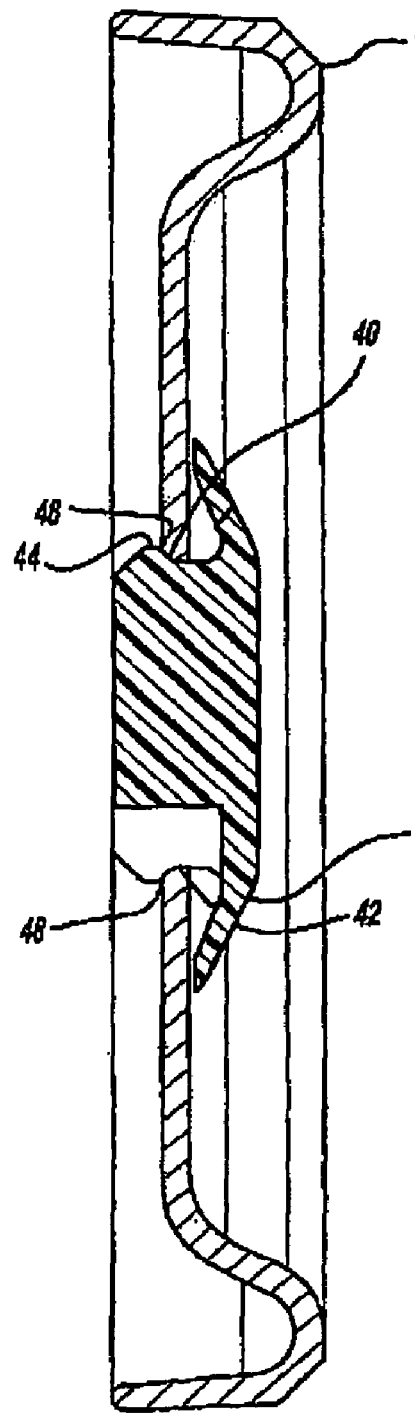
FIG. 10 is a cross-sectional view of the venting plate and vent valve of FIG. 9 taken along line 10—10.
Figure 11:
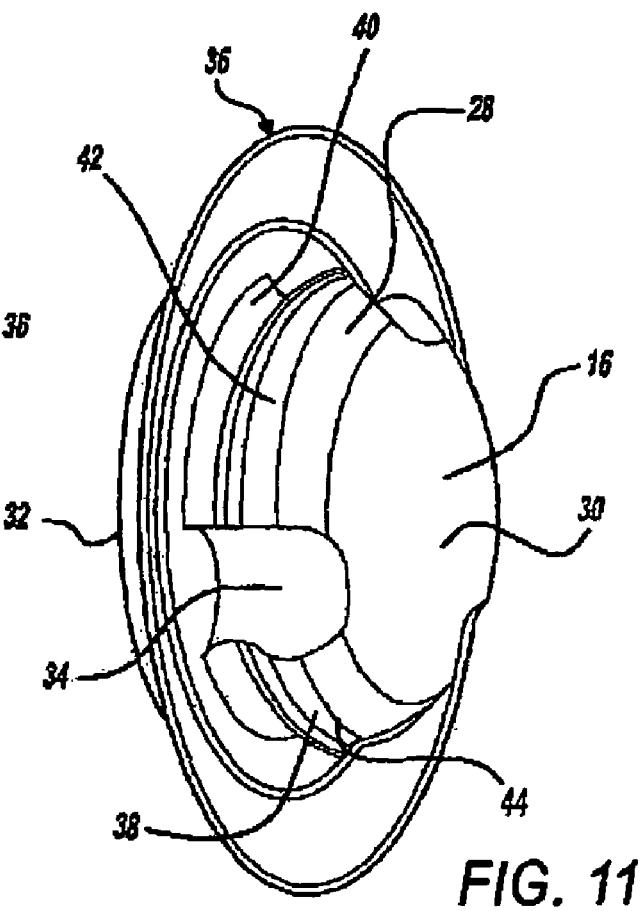
FIG. 11 is a perspective view of the venting valve of the present invention.
Figure 12:
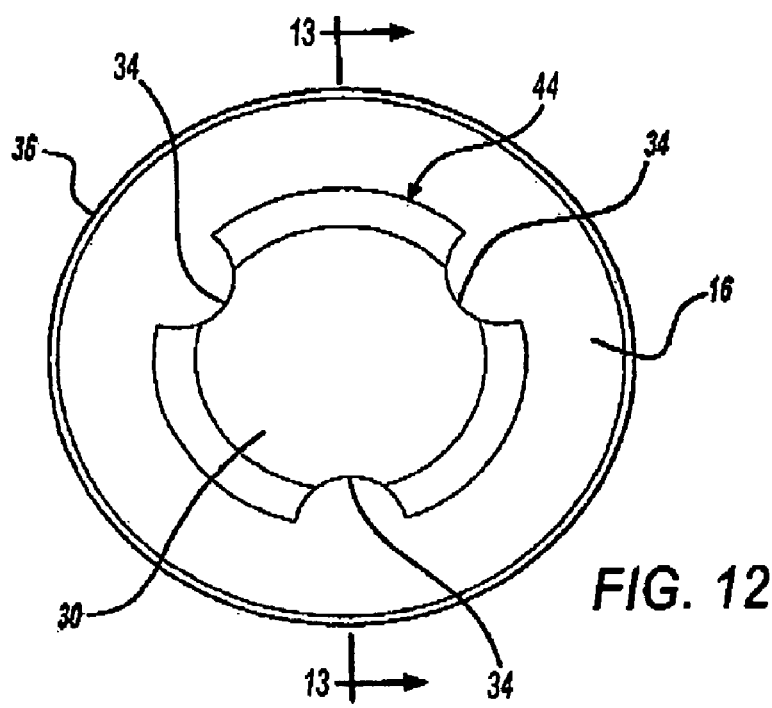
FIG. 12 is a plan view of the venting valve of the present invention.
Figure 13:
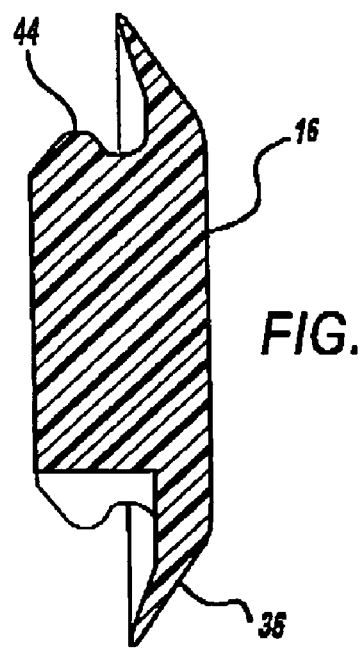
FIG. 13 is cross-sectional view of the venting valve of the present invention taken along line 13—13 of FIG. 12.

Referring to FIGS. 11–13, escape pathways 34 may be any suitable size or shape. However, in the preferred embodiment shown, three circumferentially distributed pathways 34 are generally elongated channels which are axially disposed in the outer surface 38 of body portion 28 of vent valve 16. Body portion 28 further includes an annular channel 40 defining an annular engagement surface 42 and an annular lip 44 having a surface area (or diameter) which is sufficiently greater than that of vent aperture 14 such that valve vent 16 may be press-fitted and retained in aperture 14. As can be seen in FIG. 11, it is preferred that annular lip 44 is defined by an uninterrupted and continuous periphery. Further, as is also evident from FIGS. 10 and 11, the periphery of annular lip 44 is larger than a periphery of body portion 28. It should be noted that other known fastening means may also be used. Specifically, engagement surface 42 contacts the inner wall 46 of aperture 14 and is retained by top surface 48 of annular lip 44. Vent valve 16 is manufactured from a substantially rigid material such as a thermoplastic elastomer. However, any other rigid or non-rigid material may also be used.

Figure 15:
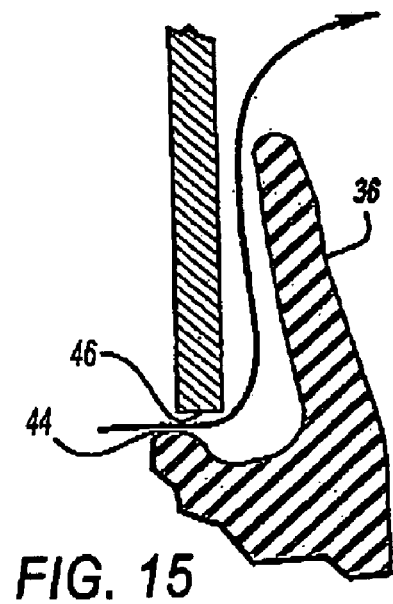
FIG. 15 is a schematic diagram of the vent valve of FIG. 8 shown in an open position in response to an internal overpressure condition.

In operation, as shown in greater detail in FIG. 10, the retention cap 36 is in a normally closed position and functions to cover the escape pathway(s) 34 and seal the joint 10, and more particularly joint chamber 25, from external contaminants which may inhibit joint operation. In response to internal pressure created in the joint cavity from grease volatility, high operating temperatures, etc., the retention cap 36 opens (e.g. moves outward) as shown in FIG. 15 to expose escape pathways 34 to the outside air (and generally lower air pressure conditions) so as to permit air to escape from the joint cavity 25 through escape pathway(s) 34 into the external atmosphere and thus relieve the joint overpressure condition.

Figure 14:
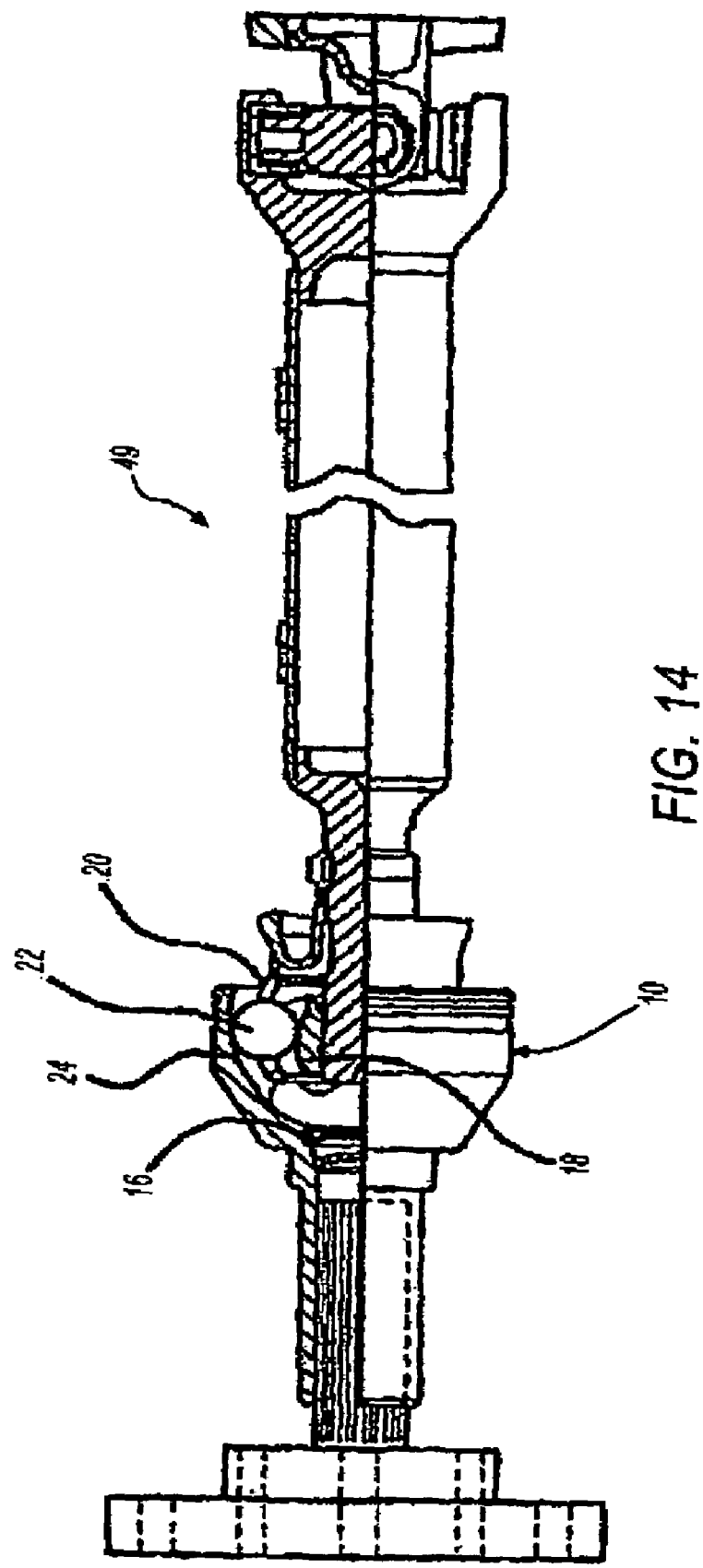
FIG. 14 is a partial cross-sectional view of the venting constant velocity joint system of the present invention shown incorporated in a shaft assembly.
Figure 16:
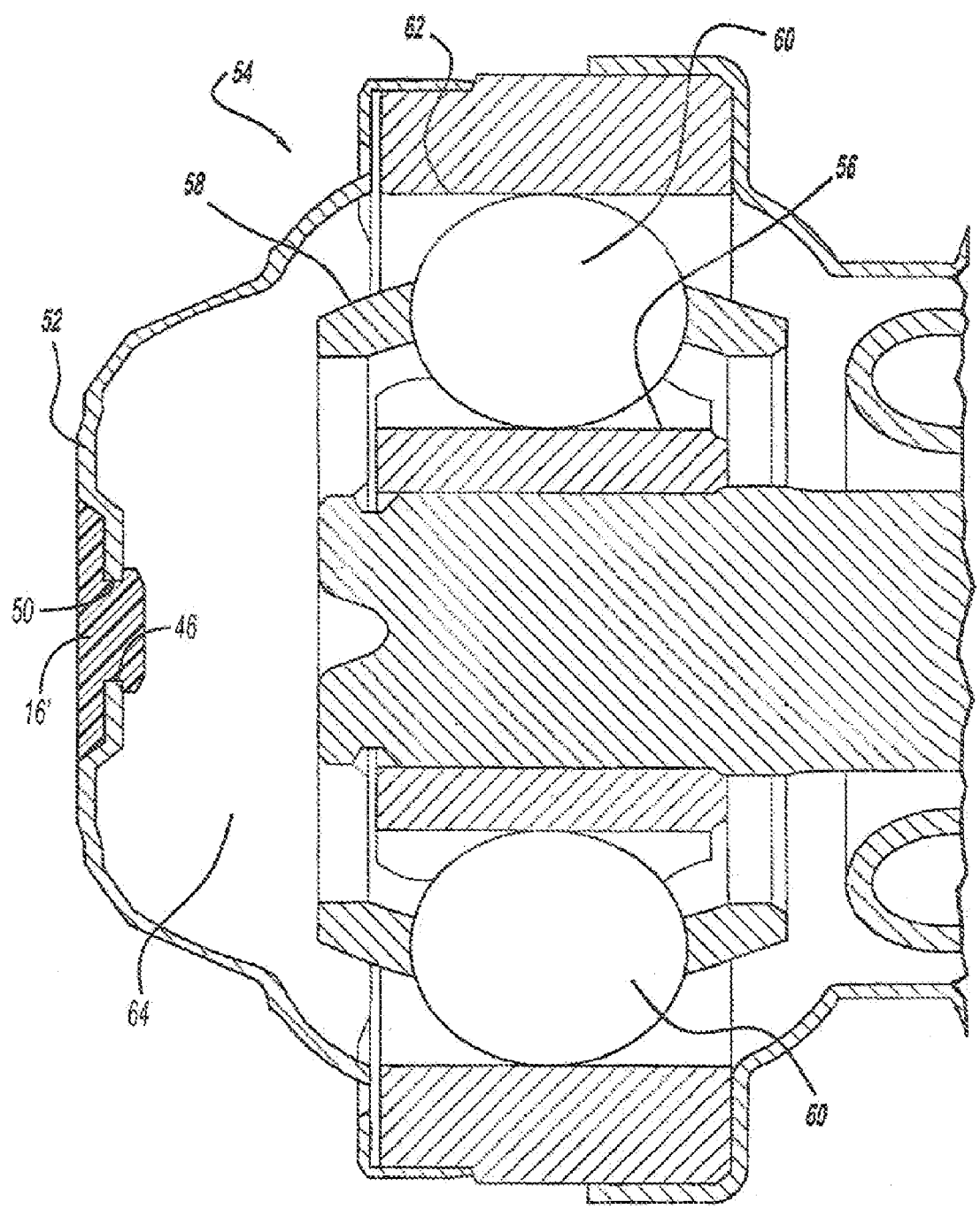
FIG. 16 is a cross-sectional view of an alternative embodiment of the venting constant velocity joint system according to the present invention as shown in a VL plunging joint.

The venting constant velocity joint design discussed above may, of course, be incorporated in any suitable shaft or shaft assembly where appropriate venting is desired or required. A typical shaft assembly incorporating the present invention is shown, for example, in FIG. 14 and designated generally by reference numeral 49. Vent valve 16 may also be incorporated in other suitable universal joints as part of a vent or breather plate as described above or directly in the joint itself. For example, as shown in FIG. 16, a vent valve 16' may be fitted to an existing or modified vent aperture 50 of a grease cap 52 of a VL style plunging joint 54. Like a monoblock design, the plunging joint 54 of FIG. 16 comprises an inner race 56, a cage 58, balls 60 and outer race 62 disposed within the joint chamber 64. Vent valve 16' is press fitted to vent aperture 50 and operates in the same manner as discussed above. Again, this venting constant velocity joint, as any of the suitable joints incorporating vent valves 16/16', may be disposed in a shaft or shaft assembly where venting is desired.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A venting constant velocity joint system, comprising:
   constant velocity joint disposed between and connected to a first shaft and a second shaft, wherein the constant velocity joint includes an internal cavity that receives a portion of the first shaft and the constant velocity joint includes a vent plate defining a vent aperture in communication with the internal cavity; and
   a vent valve receivable in the vent aperture, the vent valve comprising:
   a body portion having a first end and a second end and at least one escape pathway extending therebetween; and
   a flexible retention cap extending from the body portion; wherein the retention cap includes a downwardly extending, planar portion that includes an uninterrupted periphery that is larger than an outermost periphery of a remainder of the vent valve and wherein the retention cap is operative in a normally closed position to cover the at least one escape pathway and seal the joint from external contaminants, and in response to internal pressure created in the joint cavity functions to open and expose the at least one escape pathway to permit air to escape from the cavity.

2. A venting constant velocity joint as in claim 1, wherein the retention cap has a surface area greater than the vent aperture.

3. A venting constant velocity joint as in claim 1, wherein the retention cap has an umbrella shape.

4. A venting constant velocity joint as in claim 1, wherein the retention cap is disposed adjacent to the first end of the body and the at least one escape pathway.

5. A venting constant velocity joint as in claim 1, wherein the vent valve has an annular channel.

6. The venting constant velocity joint as in claim 1, wherein the vent valve has an annular lip.

7. The venting constant velocity joint as in claim 1, wherein the vent valve has three escape pathways.

8. The venting constant velocity joint as in claim 1, wherein the escape pathway forms an elongated channel axially into an outer surface of the body portion.

9. A venting constant velocity joint, comprising:
   a constant velocity joint having an internal cavity and a vent plate defining a vent aperture in communication with the joint cavity; and
   a vent valve receivable in the vent aperture, the vent valve comprising:
   a body portion having a first end and a second end and a plurality of circumferentially distributed pathways extending therebetween; and
   a flexible umbrella-shaped retention cap having an uninterrupted periphery such that no slots are formed therein, wherein the retention cap extends from the body portion such that the periphery of the retention cap is larger than an outermost periphery of a remainder of the vent valve;
   wherein the retention cap is operative in a normally closed position to cover the plurality of escape pathways and seal the joint from external contaminants, and in response to internal pressure created in the cavity functions to bellow outward and expose the escape pathways to permit air to escape from the cavity.

10. A venting constant velocity joint system, comprising:
    a constant velocity joint includes an internal cavity that receives a portion of a first shaft and the constant velocity joint includes a grease cap defining a vent aperture in communication with the joint cavity; and
a vent valve receivable in the vent aperture, the vent valve comprising:
a body portion having a first end and a second end and at least one escape pathway extending therebetween; and
a flexible retention cap disposed adjacent the first end of the body portion and the at least one escape pathway;
wherein the retention cap includes an uninterrupted periphery and wherein the periphery is larger than an outermost periphery of a remainder of the vent valve, and wherein the retention cap is operative in a normally closed position to cover the at least one escape pathway and seal the joint from external contaminants, and in response to internal pressure created in the joint cavity functions to open and expose the at least one escape pathway to permit air to escape from the cavity.

11. A venting constant velocity joint as in claim 10, wherein the retention cap has a surface area greater than the vent aperture.

12. A venting constant velocity joint as in claim 10, wherein the retention cap has an umbrella shape.

13. A venting constant velocity joint system, comprising:
a constant velocity joint having an internal cavity and a grease cap defining a vent aperture in communication with the joint cavity; and
a vent valve receivable in the vent aperture, the vent valve comprising:
a body portion having a first end and a second end and a plurality of circumferentially distributed pathways extending therebetween; and
a flexible umbrella-shaped retention cap extending from the body portion;
wherein the retention cap has an uninterrupted periphery that is larger than an outermost periphery of a remainder of the vent valve and wherein the retention cap is operative in a normally closed position to cover the at least one escape pathway and seal the joint from external contaminants, and in response to internal pressure created in the joint cavity functions to open and expose the at least one escape pathway to permit air to escape from the cavity.

14. A vent valve for use in a constant velocity joint having a vent aperture in communication with a joint cavity, the valve comprising:
a solid body portion having a first end and a second end and at least one escape pathway extending therebetween along a periphery of the body portion; and
a flexible retention cap extending from the body portion;
wherein the retention cap has a downwardly extending planar portion that extends downwardly at an angle and includes an uninterrupted periphery that is larger than an outermost periphery of a remainder of the vent valve and wherein the retention cap is operative in a normally closed position to cover the at least one escape pathway and seal the joint from external contaminants, and in response to internal pressure created in the joint cavity functions to open and expose the at least one pathway to permit air to escape from the cavity.

15. A vent valve as in claim 14, wherein the retention cap is disposed adjacent to the first end of the body.

16. A vent valve for use in a constant velocity joint having a vent aperture in communication with a joint cavity, the valve comprising:
a body portion having a first end and a second end and a plurality of escape pathways extending therebetween; and
an umbrella shaped flexible retention cap disposed adjacent to the first end of the body portion and the plurality of escape pathways;
wherein the retention cap has an uninterrupted outer periphery that is sized so as to be larger than an outermost periphery of a remainder of the vent valve and wherein the retention cap is operative in a normally closed position to cover the at least one escape pathway and seal the joint from external contaminants, and in response to internal pressure created in the joint cavity, functions to open and expose at least one of the plurality of escape pathways to permit air to escape from the cavity.

17. A constant velocity joint and shaft assembly, comprising:
a shaft;
a first joint part connected to the shaft;
a second joint part cooperable with the first joint part to transmit torque therebetween and defining a joint cavity;
a vent aperture in communication with the joint cavity; and
a vent valve receivable in the vent aperture, the vent valve comprising:
a body portion having a first end and a second end and at least one escape pathway extending therebetween; and
a flexible retention cap extending from the body portion;
wherein the retention cap has an uninterrupted periphery that is sized so as to be larger than an outermost periphery of a remainder of the vent valve and wherein the retention cap is operative in a normally closed position to cover the at least one escape pathway and seal the joint from external contaminants, and in response to internal pressure created in the joint cavity functions to open and expose the at least one escape pathway to permit air to escape from the cavity.

18. A constant velocity joint and shaft assembly, comprising:
a shaft;
a first joint part connected to the shaft;
a second joint part cooperable with the first joint part to transmit torque therebetween and defining a joint cavity;
a vent plate defining a vent aperture in communication with the joint cavity; and
a vent valve receivable in the vent aperture, the vent valve comprising:
a body portion having first end and a second end and at least one escape pathway extending therebetween; and
a flexible retention cap disposed adjacent to the first end of the body portion and the at least one escape pathway;
wherein the retention cap has an uninterrupted periphery that is sized so as to be larger than an outermost periphery of a remainder of the vent valve and wherein the retention cap is operative in a normally closed position to cover the at least one escape pathway and seal the joint from external contaminants, and in response to internal pressure created in the joint cavity functions to open and expose the at least one escape pathway to permit air to escape from the cavity.

19. A constant velocity joint and shaft assembly as in claim 18, wherein the vent valve has an annular channel.

20. A constant velocity joint and shaft assembly as in claim 18, wherein the vent valve has an annular lip.

* * * * *